(12) United States Patent
Wu et al.

(10) Patent No.: US 9,973,312 B2
(45) Date of Patent: May 15, 2018

(54) METHOD AND APPARATUS FOR FEEDING BACK CSI-RS RESOURCE COMBINATION, USER EQUIPMENT AND BASE STATION

(71) Applicant: Huawei Technologies Co., Ltd., Shenzhen (CN)

(72) Inventors: Yong Wu, Beijing (CN); Jianguo Wang, Bonn (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 14/669,892

(22) Filed: Mar. 26, 2015

(65) Prior Publication Data
US 2015/0200757 A1    Jul. 16, 2015

Related U.S. Application Data (63) Continuation of application No. PCT/CN2012/081971, filed on Sep. 26, 2012.

(51) Int. Cl.
| | | |
|---|---|---|
| *H04L 12/26* | (2006.01) | |
| *H04L 5/00* | (2006.01) | |
| *H04W 72/08* | (2009.01) | |
| *H04B 7/06* | (2006.01) | |
| *H04B 7/0456* | (2017.01) | |

(52) U.S. Cl.
CPC ......... *H04L 5/0048* (2013.01); *H04B 7/0456* (2013.01); *H04B 7/066* (2013.01); *H04B 7/0617* (2013.01); *H04B 7/0619* (2013.01); *H04B 7/0626* (2013.01); *H04B 7/0658* (2013.01); *H04B 7/0663* (2013.01)

(58) Field of Classification Search
CPC .... H04B 7/0417; H04B 7/0619; H04W 24/10
USPC ....................................... 370/332; 455/67.13
See application file for complete search history.

(56) References Cited

U.S. PATENT DOCUMENTS

| | | | |
|---|---|---|---|
| 2012/0127878 A1 | 5/2012 | Kim et al. | |
| 2012/0213113 A1 | 8/2012 | Zhao et al. | |
| 2012/0281555 A1* | 11/2012 | Gao ..................... | H04L 5/0051 370/252 |

(Continued)

FOREIGN PATENT DOCUMENTS

| | | |
|---|---|---|
| CN | 101326742 A | 12/2008 |
| CN | 102055508 A | 5/2011 |

(Continued)

*Primary Examiner* — Asad Nawaz
*Assistant Examiner* — Jason Harley
(74) *Attorney, Agent, or Firm* — Slater Matsil, LLP (57) ABSTRACT

Embodiments of the present invention relate to a method and an apparatus for feeding back a CSI-RS resource combination, a user equipment, and a base station. The method includes: acquiring information of a CSI-RS resource combination; determining a candidate CSI-RS resource combination according to the information of the CSI-RS resource combination, and performing a joint CSI measurement according to one or more sets of CSI-RS resources in the candidate CSI-RS resource combination, so as to select a CSI-RS resource combination according to a measurement result of the joint CSI measurement; and feeding back the selected CSI-RS resource combination and the measurement result of the joint CSI measurement corresponding to the selected CSI-RS resource combination to a base station.

24 Claims, 3 Drawing Sheets

(56) References Cited

U.S. PATENT DOCUMENTS

| | | | | |
|---|---|---|---|---|
| 2013/0250876 A1* | 9/2013 | Hugl | .................... | H04W 24/10 370/329 |
| 2013/0322273 A1* | 12/2013 | Etemad | ................ | H04W 24/10 370/252 |
| 2013/0343317 A1* | 12/2013 | Etemad | ................ | H04B 7/024 370/329 |
| 2014/0177601 A1* | 6/2014 | Nishio | ................ | H04W 24/10 370/332 |
| 2014/0254578 A1 | 9/2014 | Yamaura | | |

FOREIGN PATENT DOCUMENTS

| | | |
|---|---|---|
| CN | 102056220 A | 5/2011 |
| CN | 102195741 A | 9/2011 |
| CN | 102377469 A | 3/2012 |
| EP | 2667681 A1 | 11/2013 |
| WO | 2011146606 A1 | 11/2011 |
| WO | 2012051058 A1 | 4/2012 |
| WO | 2012097526 A1 | 7/2012 |
| WO | 2012124552 A1 | 9/2012 |

\* cited by examiner

METHOD AND APPARATUS FOR FEEDING BACK CSI-RS RESOURCE COMBINATION, USER EQUIPMENT AND BASE STATION

This application is a continuation of International Application No. PCT/CN2012/081971, filed on Sep. 26, 2012, which is hereby incorporated by reference in its entirety.

TECHNICAL FIELD

The present invention relates to the communications field, and specifically, to a method and an apparatus for feeding back a channel state information reference signal (CSI-RS) resource combination, a user equipment, and a base station.

BACKGROUND

An active antenna system (AAS) antenna array has a capability of performing dynamic adaptive beamforming (BF) in a vertical direction and a horizontal direction. This is because that multiple array elements in the vertical direction and the horizontal direction in the AAS antenna array (which generally is a planar array or a three-dimensional columnar array) can perform dynamic adaptive weighting, so as to implement so-called "three-dimensional BF". In a frequency division duplexing (FDD) system, in order to obtain better BF performance, a user equipment (UE) is required to perform a measurement on channel state information (CSI) of the AAS antenna array and then feed back a measurement result to a base station (BS).

To effectively obtain a CSI measurement result, when a measurement is performed by using a CSI-RS, a different vertical direction weight may be used for each vertical array in the AAS antenna array, so as to obtain virtual horizontal arrays pointing to different vertical directions (each virtual horizontal array may also be considered as a virtual transmission node). Each virtual horizontal array may use one set of CSI-RS resources (or different forms of virtual arrays may be formed in another manner, and each virtual array uses one set of CSI-RS resources). A BS generally configures multiple sets of CSI-RS resources for a UE, and the UE may perform a measurement on these CSI-RS resources.

It is assumed that each virtual array (for example, a virtual horizontal array) uses one set of CSI-RS resources, and a BS (for example, an evolved NodeB (eNB)) notifies a UE of M sets of CSI-RS resources. The UE selects the most preferred N sets of CSI-RS resources from the M sets of CSI-RS resources (for example, according to an RSRP criterion), and then reports an identity (ID) of a corresponding CSI-RS resource to the BS. As a result, during a next measurement, the BS configures corresponding CSI-RS resources reported by the UE for the UE, and the UE performs a measurement on these CSI-RS resources.

A disadvantage of the foregoing method is that, if the number M of sets of CSI-RS resources configured by a BS for a UE is relatively large, and the number N of sets of preferred CSI-RS resources that the UE needs to feed back is also relatively large, feedback overhead is relatively large. For example, assuming that M=10 and N=2, a combinatorial number $C_M^N$ of feedback CSI-RS resources is $C_{10}^2=45$, and then the number of bits used when the UE reports a measurement result to the BS reaches eight bits. If M and N further increase, the number of bits used during feedback is larger.

SUMMARY

The present invention proposes a method and an apparatus for feeding back a CSI-RS resource combination, a user equipment, and a base station, so as to solve a problem that the number of bits is large when a UE feeds back a CSI measurement result.

According to one aspect, a method for feeding back a CSI-RS resource combination is proposed and includes: acquiring information of a CSI-RS resource combination; determining a candidate CSI-RS resource combination according to the information of the CSI-RS resource combination, and performing a joint CSI measurement according to one or more sets of CSI-RS resources in the candidate CSI-RS resource combination, so as to select a CSI-RS resource combination according to a measurement result of the joint CSI measurement; and feeding back the selected CSI-RS resource combination and the measurement result of the joint CSI measurement corresponding to the selected CSI-RS resource combination to a base station.

Optionally, the acquiring information of a CSI-RS resource combination includes: acquiring a definition of a CSI-RS resource combination pattern, where the definition of the combination pattern is used to indicate a mode of a candidate CSI-RS resource combination. The determining a candidate CSI-RS resource combination according to the information of the CSI-RS resource combination includes: determining the candidate CSI-RS resource combination according to the definition of the CSI-RS resource combination pattern.

The definition of the combination pattern may include: combining CSI-RS resources, whose numbers are contiguous, of the CSI-RS resources; or combining CSI-RS resources, whose numbers are N apart, of the CSI-RS resources, where N is a positive integer which is greater than or equal to one, and less than a total quantity of CSI-RS resources.

Optionally, the acquiring information of a CSI-RS resource combination further includes: acquiring CSI-RS resource quantity information, where the quantity information indicates a quantity of CSI-RS resources included in the candidate CSI-RS resource combination. The determining a candidate CSI-RS resource combination according to the information of the CSI-RS resource combination includes: determining the candidate CSI-RS resource combination according to the definition of the combination pattern and the quantity information.

Alternatively, the definition of the combination pattern may further include: combining M CSI-RS resources, whose numbers are contiguous, of the CSI-RS resources, where M is a positive integer which is greater than or equal to one, and less than or equal to a total quantity of CSI-RS resources; or combining M' CSI-RS resources, whose numbers are N apart, of the CSI-RS resources, where N is a positive integer which is greater than or equal to one, and less than the total quantity of CSI-RS resources; and M' is a positive integer which is greater than or equal to one, and less than half of the total quantity of CSI-RS resources.

Optionally, the acquiring information of a CSI-RS resource combination further includes: acquiring a CSI-RS resource combination pattern number, where the combination pattern number is used to indicate a different definition of a combination pattern. The determining a candidate CSI-RS resource combination according to the information of the CSI-RS resource combination includes: determining the candidate CSI-RS resource combination according to the combination pattern number and a definition of a combination pattern corresponding to the combination pattern number, or determining the candidate CSI-RS resource combination according to the combination pattern number, the definition of the combination pattern corresponding to the combination pattern number, and CSI-RS resource quantity information.

Optionally, before the feeding back the selected CSI-RS resource combination and the measurement result of the joint CSI measurement corresponding to the selected CSI-RS resource combination to a base station, the method further includes: acquiring information about a numbering manner of the candidate CSI-RS resource combination. The feeding back the selected CSI-RS resource combination and the measurement result of the joint CSI measurement corresponding to the selected CSI-RS resource combination to a base station includes: numbering the selected CSI-RS resource combination according to the numbering manner; and feeding back the number and CSI corresponding to the number to the base station.

Optionally, before the acquiring information of a CSI-RS resource combination, the method further includes: acquiring a number range of a CSI-RS resource applicable to the information of the CSI-RS resource combination; specifically, acquiring aggregation information of CSI-RS resources, where the aggregation information is used to indicate a measurement source formed by aggregating the CSI-RS resources, and multiple sets of CSI-RS resources included in the measurement source indicate the number range of the CSI-RS resource applicable to the information of the CSI-RS resource combination.

According to another aspect, a method for feeding back a CSI-RS resource combination is proposed, including: sending information of a CSI-RS resource combination to a UE; receiving a CSI-RS resource combination measured and selected by the UE according to the information of the CSI-RS resource combination, and a measurement result of a joint CSI measurement corresponding to the CSI-RS resource combination. The information of the CSI-RS resource combination includes CSI-RS resource quantity information, or a definition of a CSI-RS resource combination pattern and the CSI-RS resource quantity information, or a CSI-RS resource combination pattern number, or the CSI-RS resource combination pattern number and the definition of the CSI-RS resource combination pattern, or the CSI-RS resource combination pattern number and the CSI-RS resource quantity information, or the CSI-RS resource combination pattern number, the definition of the CSI-RS resource combination pattern, and the CSI-RS resource quantity information, where the definition of the combination pattern is used to indicate a mode of a candidate CSI-RS resource combination, the quantity information indicates a quantity of CSI-RS resources included in the candidate CSI-RS resource combination, and the combination pattern number is used to indicate a different definition of a combination pattern. The definition of the combination pattern may not be delivered by a base station, but is defined in a protocol; the UE acquires the definition of the combination pattern directly from a protocol definition.

Herein, the definition of the combination pattern may include: combining CSI-RS resources, whose numbers are contiguous, of the CSI-RS resources; or combining CSI-RS resources, whose numbers are N apart, of the CSI-RS resources, where N is a positive integer which is greater than or equal to one, and less than a total quantity of CSI-RS resources. Alternatively, the definition of the combination pattern may include: combining M CSI-RS resources, whose numbers are contiguous, of the CSI-RS resources, where M is a positive integer which is greater than or equal to one, and less than or equal to a total quantity of CSI-RS resources; or combining M' CSI-RS resources, whose numbers are N apart, of the CSI-RS resources, where N is a positive integer which is greater than or equal to one, and less than the total quantity of CSI-RS resources; and M' is a positive integer which is greater than or equal to one, and less than half of the total quantity of CSI-RS resources.

Optionally, before the receiving a CSI-RS resource combination measured and selected by the UE according to the information of the CSI-RS resource combination, and a measurement result of a joint CSI measurement corresponding to the CSI-RS resource combination, the method further includes: sending information about a numbering manner of the candidate CSI-RS resource combination to a UE. After the receiving a CSI-RS resource combination measured and selected by the UE according to the information of the CSI-RS resource combination, and a measurement result of a joint CSI measurement corresponding to the CSI-RS resource combination, the method further includes: determining, according to the numbering manner, CSI-RS resources in the received CSI-RS resource combination measured and selected by the UE according to the information of the CSI-RS resource combination.

Optionally, before the sending information of a CSI-RS resource combination to a UE, the method further includes: sending a UE a number range of a CSI-RS resource applicable to the information of the CSI-RS resource combination; specifically, sending aggregation information of CSI-RS resources to the UE, where the aggregation information is used to indicate a measurement source formed by aggregating the CSI-RS resources, and multiple sets of CSI-RS resources included in the measurement source indicate the number range of the CSI-RS resource applicable to the information of the CSI-RS resource combination.

According to another aspect, an apparatus for feeding back a CSI-RS resource combination is proposed, including: an acquiring unit, configured to acquire information of a CSI-RS resource combination; a measuring and selecting unit, configured to determine a candidate CSI-RS resource combination according to the information of the CSI-RS resource combination, and perform a joint CSI measurement according to one or more sets of CSI-RS resources in the candidate CSI-RS resource combination, so as to select a CSI-RS resource combination according to a measurement result of the joint CSI measurement; and a feedback unit, configured to feed back the selected CSI-RS resource combination and the measurement result of the joint CSI measurement corresponding to the selected CSI-RS resource combination to a base station.

Optionally, the acquiring unit is specifically configured to acquire a definition of a CSI-RS resource combination pattern, where the definition of the combination pattern is used to indicate a mode of a candidate CSI-RS resource combination, so that the measuring and selecting unit is configured to determine the candidate CSI-RS resource combination according to the definition of the CSI-RS resource combination pattern.

Optionally, the acquiring unit is further configured to acquire CSI-RS resource quantity information, where the quantity information indicates a quantity of CSI-RS resources included in the candidate CSI-RS resource combination, so that the measuring and selecting unit is configured to determine the candidate CSI-RS resource combination according to the definition of the combination pattern and the quantity information.

Optionally, the acquiring unit is further configured to acquire a CSI-RS resource combination pattern number, where the combination pattern number is used to indicate a different definition of a combination pattern, so that the measuring and selecting unit is configured to determine the candidate CSI-RS resource combination according to the combination pattern number and the definition of the combination pattern corresponding to the combination pattern number, or determine the candidate CSI-RS resource combination according to the combination pattern number, the definition of the combination pattern corresponding to the combination pattern number, and the quantity information.

Optionally, the acquiring unit is further configured to acquire information about a numbering manner of the candidate CSI-RS resource combination before the selected CSI-RS resource combination and the measurement result of the joint CSI measurement corresponding to the selected CSI-RS resource combination are fed back to the base station, so that the feedback unit is configured to number the selected CSI-RS resource combination according to the numbering manner, and feed back the number and CSI corresponding to the number to the base station.

Optionally, the acquiring unit is further configured to acquire a number range of a CSI-RS resource applicable to the information of the CSI-RS resource combination before the acquiring the information of the CSI-RS resource combination; specifically, acquire aggregation information of CSI-RS resources, where the aggregation information is used to indicate a measurement source formed by aggregating the CSI-RS resources, and multiple sets of CSI-RS resources included in the measurement source indicate the number range of the CSI-RS resource applicable to the information of the CSI-RS resource combination.

According to another aspect, an apparatus for feeding back a CSI-RS resource combination is proposed, including: a sending unit, configured to send information of a CSI-RS resource combination to a UE; and a receiving unit, configured to receive a CSI-RS resource combination measured and selected by the UE according to the information of the CSI-RS resource combination, and a measurement result of a joint CSI measurement corresponding to the CSI-RS resource combination.

The information of the CSI-RS resource combination includes a definition of a CSI-RS resource combination pattern and CSI-RS resource quantity information, or a CSI-RS resource combination pattern number and the definition of the CSI-RS resource combination pattern, or the CSI-RS resource combination pattern number, the definition of the CSI-RS resource combination pattern, and the CSI-RS resource quantity information, where the definition of the combination pattern is used to indicate a mode of a candidate CSI-RS resource combination, the quantity information indicates a quantity of CSI-RS resources included in the candidate CSI-RS resource combination, and the combination pattern number is used to indicate a different definition of a combination pattern.

Optionally, the sending unit is further configured to send information about a numbering manner of the candidate CSI-RS resource combination to a UE before the receiving unit receives the CSI-RS resource combination measured and selected by the UE according to the information of the CSI-RS resource combination, and the measurement result of the joint CSI measurement corresponding to the CSI-RS resource combination, so that after the receiving the CSI-RS resource combination measured and selected by the UE according to the information of the CSI-RS resource combination, and the measurement result of the joint CSI measurement corresponding to the CSI-RS resource combination, the receiving unit is configured to determine, according to the numbering manner, CSI-RS resources in the received CSI-RS resource combination measured and selected by the UE according to the information of the CSI-RS resource combination.

Optionally, the sending unit is further configured to send a UE a number range of a CSI-RS resource applicable to the information of the CSI-RS resource combination before the sending the information of the CSI-RS resource combination to the UE. Specifically, the sending unit is configured to send aggregation information of CSI-RS resources to the UE, where the aggregation information is used to indicate a measurement source formed by aggregating the CSI-RS resources, and multiple sets of CSI-RS resources included in the measurement source indicate the number range of the CSI-RS resource applicable to the information of the CSI-RS resource combination.

According to another aspect, a user equipment is proposed, including: an input device, configured to receive input from a user or input from another device; a memory, configured to store data to be processed in the method executed by a UE; a processor, configured to execute the data stored in the memory; and an output device, configured to output a processing result of the processor.

According to another aspect, a base station is proposed, including: an input device, configured to receive input from another device; a memory, configured to store data to be processed in the method executed by a base station; a processor, configured to execute the data stored in the memory; and an output device, configured to output a processing result of the processor.

In embodiments of the present invention, a CSI-RS resource combination mode is predefined, so that a UE only needs to perform a measurement and feedback in a given candidate CSI-RS resource combination, thereby reducing possible CSI-RS resource combination modes, restricting a combination range, greatly reducing the number of joint CSI measurements performed by the UE, and reducing the number of feedback bits.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, and the like.

A user equipment (UE) may also be referred to as a mobile terminal, a mobile station, and the like. The user equipment may communicate with one or more core networks by using a radio access network (RAN). The UE exchanges voice and/or data with the radio access network.

A base station may be a base station (BTS) in the GSM or CDMA, may also be a base station (NodeB) in the WCDMA, and may further be an evolved NodeB (eNB, e-NodeB) in the LTE, which is not limited in the present invention. Moreover, one base station may support/manage one or multiple cells (cell) or transmission nodes. When the UE needs to communicate with a network, the UE selects one cell or several transmission nodes in one cell to initiate network access.

In order to further reduce the number of feedback bits needed by three-dimensional BF in an AAS application, a distribution situation of multiple paths from an AAS array to a UE may be further investigated. In multipath transmission from the AAS array to the UE, from the perspective of a vertical direction, multiple paths are generally covered by multiple continuous beams. For example, it is assumed that there are M=10 virtual horizontal arrays (or called ten virtual transmission nodes, corresponding to ten vertical beam directions), that is, ten sets of CSI-RS resources are used in total. In some scenarios, paths from the AAS array to the UE may mainly concentrate on one or two directions in the vertical direction; therefore, the paths may be covered by one of the following beam combinations: {1,2}, {2,3}, ... , {9,10}. Therefore, the UE generally needs to perform a measurement only according to two sets of CSI-RS resources whose numbers are contiguous in the ten sets of CSI-SR resources. The UE needs to report numbers of the two sets of preferred CSI-RS resources whose numbers are contiguous. In the prior art, an eNB notifies the UE to select two sets of preferred CSI-RS resources from the ten sets of CSI-RS resources; or the UE decides to select two sets of preferred CSI-RS resources from the ten sets of CSI-RS resources. After selecting two CSI-RS resources from the ten sets of CSI-RS resources, the UE reports corresponding CSI-RS resource numbers. This needs 8 bits (each CSI-RS resource number needs to be represented by using 4 bits). This manner is equivalent to forming combinations by selecting two sets of CSI-RS resources from the ten sets of CSI-RS resources, and there are $C_{10}^2=45$ combinations in total; therefore, the number of needed feedback bits is relatively large. However, according to the foregoing analysis, when the UE needs to select N=2 preferred CSI-RS resources and perform a CSI measurement on the two CSI-RS resources, the UE does not need to select from all possible combinations ($C_{10}^2=45$), and only needs to select from the foregoing combinations in which CSI-RS resource numbers are contiguous. A collection of some "beam combinations" (or CSI-RS resource combinations, or transmission point combinations) may be predefined by using this feature. The collection may also be called a combination pattern, and the combination pattern includes some candidate CSI-RS resource combinations that are predefined. The UE selects one (or more) preferred CSI-RS resource combination from these predefined candidate combinations according to a certain criterion, and then reports a corresponding number of the selected CSI-RS resource combination (in the foregoing example, because there are only 9 possible combinations, feedback of a needed number can be completed by using four bits) and a corresponding measurement result to the eNB, thereby achieving a purpose of reducing the number of feedback bits.

Figure 1:
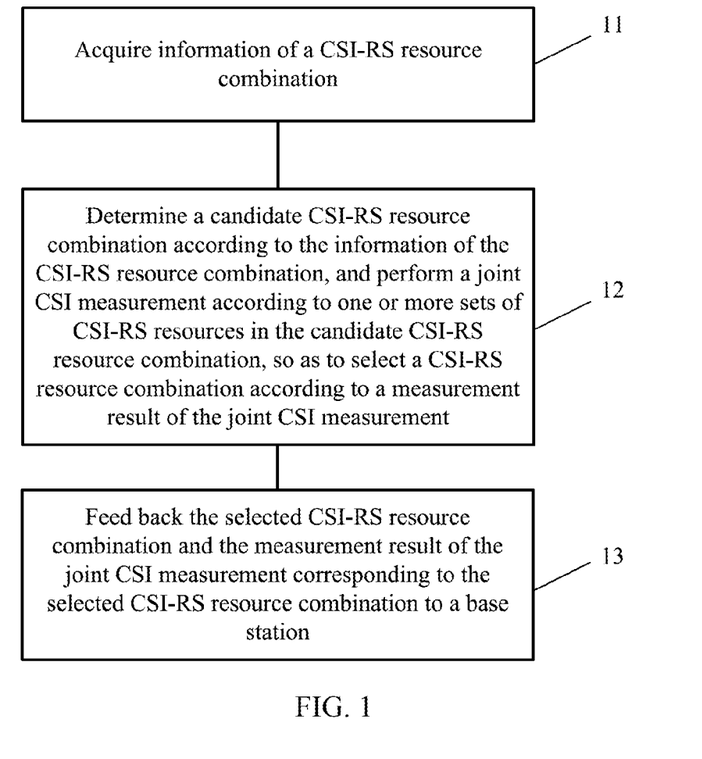
FIG. 1 is a flowchart of a method for feeding back a CSI-RS resource combination according to an embodiment of the present invention.

The following describes in detail a method for feeding back a CSI-RS resource combination according to an embodiment of the present invention with reference to FIG. 1, and the method includes the following steps.

11. A UE acquires information of a CSI-RS resource combination.

It should be understood that, the UE may acquire the information of the CSI-RS resource combination from a base station by using RRC signaling. Information of a CSI-RS resource combination may also be predefined in a communications protocol, so that the UE and the base station directly use the information of the CSI-RS resource combination.

12. The UE determines a candidate CSI-RS resource combination according to the information of the CSI-RS resource combination, performs a joint CSI measurement according to one or more sets of CSI-RS resources in the candidate CSI-RS resource combination, and selects a CSI-RS resource combination according to a measurement result of the joint CSI measurement.

Herein, the so-called "joint CSI measurement", for example, may use the following manners: In a first manner, when a CSI-RS resource combination includes multiple sets of CSI-RS resources (for example, two sets), a channel matrix H_i may be estimated according to each set of CSI-RS resource; then, a total channel matrix H is constituted by the channel matrix H_i separately estimated according to each set of CSI-RS resource, for example, a total channel matrix H=[H_1, H_2] is constituted by channel matrixes respectively estimated according to the foregoing two sets of CSI-RS resources; finally, a CSI-RS measurement is performed according to the total channel matrix H. In a second manner, when a CSI-RS resource combination includes multiple sets of CSI-RS resources (for example, two sets), a channel matrix H_i may be estimated according to each set of CSI-RS resource; then, series of CSI measurement values, such as CQI_i, PMI_i, and Rank_i, are obtained according to the channel matrix H_i; finally, all multiple sets of CSI measurement values are combined in a certain manner, and a final CSI measurement value is obtained, for example, for the two sets of CSI measurement values, CQI=CQI_1+CQI_2. Generally, "joint CSI measurement" of the first manner is preferably used, and it should be understood that a measurement result of "joint CSI measurement" of the second manner is the same as that of the "joint CSI measurement" of the first manner.

It can be learned from the foregoing description that in an implementation manner, if the information of the CSI-RS resource combination acquired by the UE is a definition of a CSI-RS resource combination pattern, where the definition of the combination pattern is used to indicate a mode of a candidate CSI-RS resource combination. It is assumed that only one combination pattern is defined; then, the UE may determine all candidate CSI-RS resource combinations according to the definition of the CSI-RS resource combination pattern, perform a joint CSI measurement on one or more sets of CSI-RS resources in each of the candidate CSI-RS resource combinations, and select a CSI-RS resource combination according to a measurement result of the joint CSI measurement.

The foregoing combination pattern may be defined as: combining CSI-RS resources, whose numbers are contiguous, of the CSI-RS resources; and may also be defined as: combining CSI-RS resources, whose numbers are N apart, of the CSI-RS resources, where N is a positive integer which is greater than or equal to one, and less than a total number of sets of CSI-RS resources. In a communications system, each set of CSI-RS resource has a corresponding number; for example, if there are 10 sets of CSI-RS resources, the 10 sets of CSI-RS resources may be numbered as 1, 2, 3, . . . , and 10, or may be numbered by using other numbers. It should be understood that a CSI-RS resource number in the communications system is unique and not duplicate.

Because the definition of the combination pattern does not include a quantity of CSI-RS resources included in each candidate combination, the UE may further acquire CSI-RS resource quantity information, where the quantity information indicates a quantity of CSI-RS resources included in the candidate CSI-RS resource combination, for example, two CSI-RS resources, or three CSI-RS resources. Then, the UE may determine all the candidate CSI-RS resource combinations according to the definition of the CSI-RS resource combination pattern and the CSI-RS resource quantity information, perform a joint CSI measurement on one or more sets of CSI-RS resources in each of the candidate CSI-RS resource combinations, and select a CSI-RS resource combination according to a measurement result of the joint CSI measurement.

Six virtual horizontal arrays are used as an example; if a definition of a combination pattern is consecutive CSI-RS resources and CSI-RS resource quantity information is two CSI-RS resources, the combination pattern includes the following candidate combinations: {1,2}, {2,3}, {3,4}, {4,5}, and {5,6}; if a definition of a combination pattern is consecutive CSI-RS resources and CSI-RS resource quantity information is three CSI-RS resources, the combination pattern includes the following candidate combinations: {1,2, 3}, {2,3,4}, {3,4,5}, and {4,5,6}; if a definition of a combination pattern is CSI-RS resources with an interval of one and CSI-RS resource quantity information is two CSI-RS resources, the combination pattern includes the following candidate combinations: {1,3}, {2,4}, {3,5}, and {4,6}; if a definition of a combination pattern is CSI-RS resources with an interval of one and CSI-RS resource quantity information is three CSI-RS resources, the combination pattern includes the following candidate combinations: {1,3,5} and {2,4,6}; if a definition of a combination pattern is CSI-RS resources with an interval of two and CSI-RS resource quantity information is two CSI-RS resources, the combination pattern includes the following candidate combinations: {1,4}, {2,5}, and {3,6}.

It is easy to understand that, if CSI-RS resource quantity information is two CSI-RS resources by default and only one combination pattern exists, the UE only needs to know a definition of the combination pattern, then may determine all candidate combinations under a given combination pattern according to the definition of the combination pattern, and perform a joint CSI measurement according to one or more sets of CSI-RS resources included in each candidate combination.

Another possibility is that the definition of the combination pattern includes a quantity of CSI-RS resources which are specifically included in each candidate combination, for example, M CSI-RS resources, whose numbers are contiguous, of the CSI-RS resources are combined, where M is a positive integer which is greater than or equal to one, and less than or equal to a total quantity of CSI-RS resources; or M' CSI-RS resources, whose numbers are N apart, of the CSI-RS resources are combined, where N is a positive integer which is greater than or equal to one, and less than the total quantity of CSI-RS resources; and M' is a positive integer which is greater than or equal to one, and less than half of the total quantity of CSI-RS resources.

It can be seen that, in this implementation manner, because the UE performs a joint CSI measurement according to one combination pattern, all candidate combinations are determined only according to a definition of a CSI-RS resource combination pattern, or the definition of the CSI-RS resource combination pattern and CSI-RS resource quantity information, and then a joint CSI measurement is performed according to one or more sets of CSI-RS resources included in a candidate combination. In addition, the UE may also perform a joint CSI measurement according to multiple different combination patterns, so as to improve a measurement result.

Optionally, in another implementation manner, if multiple definitions of combination patterns exist, information of a CSI-RS resource combination acquired by a UE may be a CSI-RS resource combination pattern number, and the combination pattern number is used to indicate a different definition of a combination pattern. Then, a candidate CSI-RS resource combination is determined according to the combination pattern number and a definition of a combination pattern corresponding to the combination pattern number, a joint CSI measurement is performed according to one or more sets of CSI-RS resources included in the candidate CSI-RS resource combination, and a CSI-RS resource combination is selected according to a measurement result of the joint CSI measurement. It should be understood that, although there are multiple combination patterns indicated by combination pattern numbers, the UE performs a joint CSI measurement only according to one notified combination pattern every time, and feeds back a measurement result to a base station.

Likewise, if a definition of a combination pattern does not include a quantity of CSI-RS resources included in each candidate combination, on the basis of further acquiring CSI-RS resource quantity information included in each candidate combination, the UE may further determine all candidate CSI-RS resource combinations according to the combination pattern number, the definition of the combination pattern corresponding to the combination pattern number, and the quantity information, then perform a joint CSI measurement on one or more sets of CSI-RS resources in each candidate CSI-RS resource combination, and select a CSI-RS resource combination according to a measurement result of the joint CSI measurement.

After the UE performs a joint CSI measurement on one or more sets of CSI-RS resources in a candidate combination according to the foregoing information of the CSI-RS resource combination, the UE may select a CSI-RS resource combination according to a measurement result of the joint CSI measurement.

It can be seen that, a CSI-RS resource combination mode is predefined, so that a UE only needs to perform a measurement and feedback in a given candidate CSI-RS resource combination, thereby reducing possible CSI-RS resource combination modes, restricting a combination range, greatly reducing the number of joint CSI measurements performed by the UE, and reducing the number of feedback bits. As mentioned above, when the number M of sets of CSI-RS resources is ten and the number N of sets of preferred CSI-RS resources is two, a combinatorial number $C_M^N$ of fed back CSI-RS resources is $C_{10}^2=45$, and the number of feedback bits reaches eight bits. However, when a combination pattern manner is used, the number M of sets of CSI-RS resources is also ten and the number N of sets of preferred CSI-RS resources is also two, and that a combination pattern is defined as combining CSI-RS resources, whose numbers are contiguous, of the CSI-RS resources is used as an example, the UE only needs to perform a measurement on {1,2}, {2,3}, {3,4}, {4,5}, {5,6}, {6,7}, {7,8}, {8,9}, and {9,10} (nine combinations in total), and therefore, the number of feedback bits is four.

13. The UE feeds back the selected CSI-RS resource combination and the measurement result of the joint CSI measurement corresponding to the selected CSI-RS resource combination to a base station.

In order to facilitate reduction of the number of feedback bits, the UE may number the selected CSI-RS resource combination, and feed back the number and a measurement result of a joint CSI measurement corresponding to the number to the base station.

For example, before the selected CSI-RS resource combination and the measurement result of the joint CSI measurement corresponding to the selected CSI-RS resource combination are fed back to the base station, the UE needs to acquire information about a numbering manner of the candidate CSI-RS resource combination. For example, numbering is performed in the following manner: CSI-RS resource combinations are numbered by using smallest CSI-RS resource numbers included in the CSI-RS resource combinations in an ascending order, and vice versa. For example, all candidate combinations obtained from a certain definition of a combination pattern are: {1,2}, {2,3}, {3,4}, {4,5}, {5,6}, {6,7}, {7,8}, {8,9}, and {9,10}; according to the foregoing numbering rule, a combination numbered 1 is {1,2}, a combination numbered 2 is {2,3}, and by analogy, a combination numbered 9 is {9,10}.

In this way, the UE may number the selected CSI-RS resource combination according to the numbering manner, and then only needs to feed back the number and CSI corresponding to the number to the base station, thereby achieving a purpose of reducing the number of feedback bits.

In the foregoing description, a method for feeding back a CSI-RS resource combination is implemented between a UE and a node in a cell. Multiple communications network structures have been researched and developed, where multiple nodes may exist in one cell, for example, a macro node and a micro node in a scenario of CoMP scenario 4 in an LTE standard. Therefore, before the UE acquires information of a CSI-RS resource combination, the UE may further acquire a number range of a CSI-RS resource applicable to the information of the CSI-RS resource combination (the number range may also be called a CSI-RS measurement source applicable to the information of the CSI-RS resource combination). For example, the UE may acquire aggregation information of CSI-RS resources, and then determine a measurement source, where the CSI-RS aggregation information is used to indicate a manner of forming a measurement source by aggregating CSI-RS resources, and then the number range of the CSI-RS resource applicable to the information of the CSI-RS resource combination may be determined. Therefore, the UE may determine a total number of and the number range of CSI-RS resources applicable to the information of the CSI-RS resource combination. A different measurement source may have different information of a CSI-RS resource combination.

A situation in which a macro node and a micro node share a cell identity (ID) is used as an example, and it is assumed that the macro node uses an AAS and the micro node uses a common antenna array.

In an embodiment, four micro nodes and one macro node constitute a cell. Each micro node uses one set of CSI-RS resource; on an AAS of the macro node, multiple sets (for example, ten sets) of virtual (horizontal) arrays are formed, that is, ten sets of CSI-RS resources are used. It is assumed that CSI-RS resource numbers are as follows: micro node 1 is corresponding to CSI-RS resource #1; micro node 2 is corresponding to CSI-RS resource #2; the macro node is corresponding to CSI-RS resources #3 to #12; micro node 3 is corresponding to CSI-RS resource #13; micro node 4 is corresponding to CSI-RS resource #14. In this case, it is necessary to aggregate CSI-RS resources #3 to #12 to form a measurement source, and notify a UE of the aggregation manner and information (such as a combination pattern number) of a CSI-RS resource combination in the measurement source. Therefore, the UE needs to acquire a CSI-RS measurement source (that is, a number range of a CSI-RS resource) to which information of a CSI-RS resource combination is applicable. In this embodiment, the CSI-RS measurement source is CSI-RS resources #3 to #12 (ten sets in total). In this embodiment, a base station notifies the UE that five measurement sources, that is, {1}, {2}, {3-12}, {13}, and {14}, are formed in a corresponding CSI-RS resource aggregation manner. That is, the base station notifies the UE of (or the UE acquires) aggregation information of CSI-RS resources. Generally, for a measurement source, in which a quantity of CSI-RS resources is greater than or equal to three, in measurement sources formed by aggregating CSI-RS resources, the base station may notify the measurement source of a to-be-used definition of a combination pattern of CSI-RS resources and/or a quantity of CSI-RS resources included in a candidate combination. In this embodiment, for the third CSI-RS measurement source {3-12}, if the used definition of the combination pattern is combining CSI-RS resources whose numbers are contiguous, and CSI-RS resource quantity information indicates two CSI-RS resources, it may be determined that all candidate combinations are {3,4}, {4,5}, . . . , and {11,12}.

If there is only one definition of a combination pattern, the base station may notify each CSI-RS measurement source of the used definition of the combination pattern and/or a quantity of CSI-RSs included in a candidate combination (it should be noted that a quantity of CSI-RSs included in the measurement source should be greater than or equal to the quantity of CSI-RSs included in a candidate combination in the combination pattern; otherwise, no notification is given, and the below is same). If there are multiple definitions of combination patterns, the base station may notify each CSI-RS measurement source of a used combination pattern number and/or the quantity of CSI-RSs included in a candidate combination.

For a corresponding CSI-RS measurement source, the UE traverses all candidate combinations according to information of a CSI-RS resource combination (such as a definition of a combination pattern), selects, according to a certain criterion, one or more CSI-RS resource combinations preferred by the aggregation set and measurement results of joint CSI measurements corresponding to the CSI-RS resource combinations, and then reports the CSI-RS resource combinations and the measurement results to the base station.

It can be learned from the foregoing description that a method for feeding back a CSI-RS resource combination according to an embodiment of the present invention can effectively reduce the number of bits used when a UE feeds back a CSI measurement result. Specifically, in this embodiment of the present invention, a CSI-RS resource combination mode is predefined, so that a UE only needs to perform a measurement and feedback in a given candidate CSI-RS resource combination, thereby reducing possible CSI-RS resource combination modes, restricting a combination range, greatly reducing the number of joint CSI measurements performed by the UE, and reducing the number of feedback bits.

Figure 2:
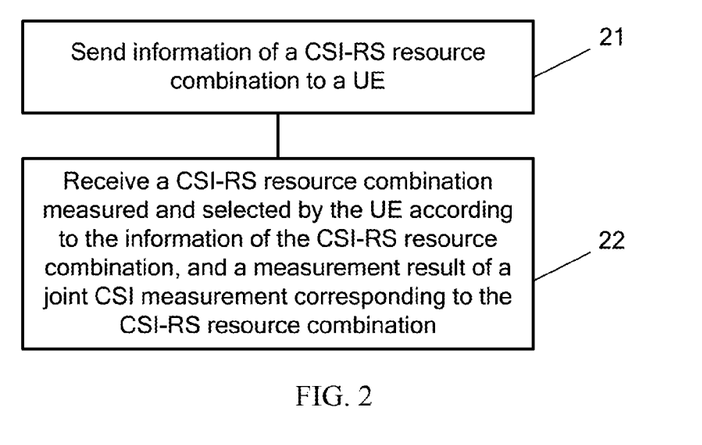
FIG. 2 is a flowchart of a method for feeding back a CSI-RS resource combination according to an embodiment of the present invention.

The following describes in detail a method for feeding back a CSI-RS resource combination according to another embodiment of the present invention with reference to FIG. 2. Because FIG. 2 shows a method on a base station side, which is corresponding to a method on a UE side shown in FIG. 1, duplicate content is not described herein again. The method shown in FIG. 2 includes the following steps:

21. A base station sends information of a CSI-RS resource combination to a UE.

The information of the CSI-RS resource combination includes a definition of a CSI-RS resource combination pattern and CSI-RS resource quantity information, or a CSI-RS resource combination pattern number and the definition of the CSI-RS resource combination pattern, or the CSI-RS resource combination pattern number, the definition of the CSI-RS resource combination pattern, and the CSI-RS resource quantity information, where the definition of the combination pattern is used to indicate a combination mode of a candidate CSI-RS resource combination, the quantity information indicates a quantity of CSI-RS resources included in the candidate CSI-RS resource combination, and the combination pattern number is used to indicate a different definition of a combination pattern.

Further, the definition of the combination pattern may include: combining CSI-RS resources, whose numbers are contiguous, of the CSI-RS resources; or combining CSI-RS resources, whose numbers are N apart, of the CSI-RS resources, where N is a positive integer which is greater than or equal to one, and less than a total quantity of CSI-RS resources.

In addition, before the base station sends the information of the CSI-RS resource combination to the UE, the base station may further send the UE a number range of a CSI-RS resource applicable to the information of the CSI-RS resource combination, or aggregation information of CSI-RS resources. For example, the base station sends aggregation information of CSI-RS resources to the UE, where the aggregation information is used to instruct the UE to aggregate multiple sets of CSI-RS resources to form a measurement source, and multiple sets of CSI-RS resource numbers included in the measurement source indicate a number range of a CSI-RS resource applicable to the information of the CSI-RS resource combination.

22. The base station receives a CSI-RS resource combination measured and selected by the UE according to the information of the CSI-RS resource combination, and a measurement result of a joint CSI measurement corresponding to the CSI-RS resource combination.

In addition, before the base station receives the CSI-RS resource combination measured and selected by the UE according to the information of the CSI-RS resource combination, and the measurement result of the joint CSI measurement corresponding to the CSI-RS resource combination, the base station may further send information about a numbering manner of the candidate CSI-RS resource combination to the UE. After the base station receives the CSI-RS resource combination measured and selected by the UE according to the information of the CSI-RS resource combination, and the measurement result of the joint CSI measurement corresponding to the CSI-RS resource combination, the base station may further determine, according to the numbering manner, CSI-RS resource numbers in the received CSI-RS resource combination measured and selected by the UE according to the information of the CSI-RS resource combination.

It can be learned from the foregoing description that a method for feeding back a CSI-RS resource combination according to an embodiment of the present invention can effectively reduce the number of bits used when a UE feeds back a CSI measurement result. Specifically, in this embodiment of the present invention, a CSI-RS resource combination mode is predefined, so that a UE only needs to perform a measurement and feedback in a given candidate CSI-RS resource combination, thereby reducing possible CSI-RS resource combination modes, restricting a combination range, greatly reducing the number of joint CSI measurements performed by the UE, and reducing the number of feedback bits.

Figure 3:
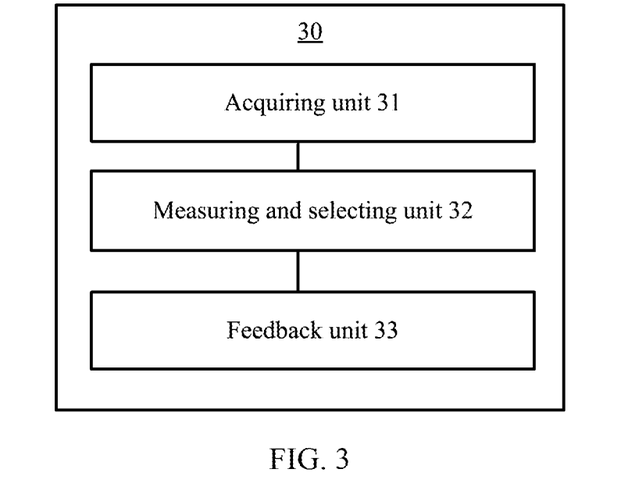
FIG. 3 is a schematic structural diagram of an apparatus for feeding back a CSI-RS resource combination according to an embodiment of the present invention.

With reference to FIG. 3, a structure of an apparatus for feeding back a CSI-RS resource combination according to an embodiment of the present invention is schematically described. As shown in the figure, an apparatus 30 for feeding back a CSI-RS resource combination includes an acquiring unit 31, a measuring and selecting unit 32, and a feedback unit 33. The acquiring unit 31 is configured to acquire information of a CSI-RS resource combination. The measuring and selecting unit 32 is configured to determine a candidate CSI-RS resource combination according to the information of the CSI-RS resource combination, and perform a joint CSI measurement according to one or more sets of CSI-RS resources in the candidate CSI-RS resource combination, so as to select a CSI-RS resource combination according to a measurement result of the joint CSI measurement. The feedback unit 33 is configured to feed back the selected CSI-RS resource combination and the measurement result of the joint CSI measurement corresponding to the selected CSI-RS resource combination to a base station.

Specifically, for example, the acquiring unit 31 may be configured to acquire a definition of a CSI-RS resource combination pattern, where the definition of the combination pattern is used to indicate a mode of a candidate CSI-RS resource combination, so that the measuring and selecting unit 32 may be configured to determine the candidate CSI-RS resource combination according to the definition of the CSI-RS resource combination pattern.

Optionally, the acquiring unit 31 may be further configured to acquire CSI-RS resource quantity information, where the quantity information indicates a quantity of CSI-RS resources included in the candidate CSI-RS resource combination, so that the measuring and selecting unit 32 may be configured to determine the candidate CSI-RS resource combination according to the definition of the combination pattern and the quantity information.

Optionally, the acquiring unit 31 may be further configured to acquire a CSI-RS resource combination pattern number, where the combination pattern number is used to indicate a different definition of a combination pattern, so that the measuring and selecting unit 32 is configured to determine the candidate CSI-RS resource combination according to the combination pattern number and the definition of the combination pattern corresponding to the combination pattern number, or determine the candidate CSI-RS resource combination according to the combination pattern number, the definition of the combination pattern corresponding to the combination pattern number, and the quantity information.

Optionally, the acquiring unit 31 may be further configured to acquire information about a numbering manner of the candidate CSI-RS resource combination before the selected CSI-RS resource combination and the measurement result of the joint CSI measurement corresponding to the selected CSI-RS resource combination are fed back to the base station, so that the feedback unit 33 is configured to number the selected CSI-RS resource combination according to the numbering manner, and feed back the number and CSI corresponding to the number to the base station.

Alternatively, the acquiring unit 31 is further configured to acquire a number range of a CSI-RS resource applicable to the information of the CSI-RS resource combination before the acquiring the information of the CSI-RS resource combination. For example, the acquiring unit 31 may acquire aggregation information of CSI-RS resources, where the aggregation information is used to indicate a measurement source formed by aggregating the CSI-RS resources, and multiple sets of CSI-RS resources included in the measurement source indicate the number range of the CSI-RS resource applicable to the information of the CSI-RS resource combination.

It can be learned from the foregoing description that an apparatus for feeding back a CSI-RS resource combination according to an embodiment of the present invention can effectively reduce the number of bits used when a UE feeds back a CSI measurement result. Specifically, in this embodiment of the present invention, a CSI-RS resource combination mode is predefined, so that a UE only needs to perform a measurement and feedback in a given candidate CSI-RS resource combination, thereby reducing possible CSI-RS resource combination modes, restricting a combination range, greatly reducing the number of joint CSI measurements performed by the UE, and reducing the number of feedback bits.

Figure 4:
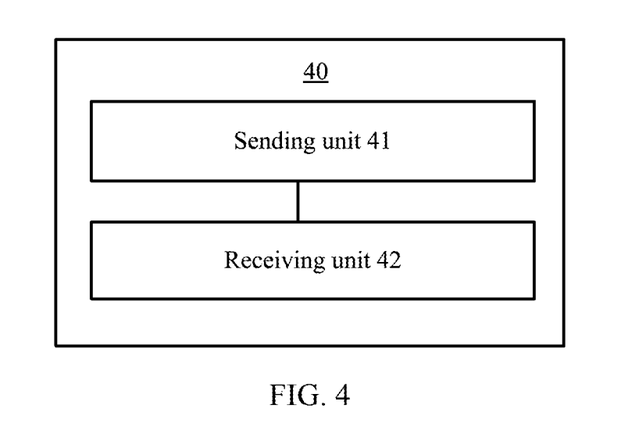
FIG. 4 is a schematic structural diagram of an apparatus for feeding back a CSI-RS resource combination according to another embodiment of the present invention.

With reference to FIG. 4, a structure of an apparatus for feeding back a CSI-RS resource combination according to another embodiment of the present invention is schematically described. As shown in the figure, an apparatus 40 for feeding back a CSI-RS resource combination includes a sending unit 41 and a receiving unit 42. The sending unit 41 is configured to send information of a CSI-RS resource combination to a UE. The receiving unit 42 is configured to receive a CSI-RS resource combination measured and selected by the UE according to the information of the CSI-RS resource combination, and a measurement result of a joint CSI measurement corresponding to the CSI-RS resource combination.

Herein, the information of the CSI-RS resource combination may include a definition of a CSI-RS resource combination pattern and CSI-RS resource quantity information, or a CSI-RS resource combination pattern number and the definition of the CSI-RS resource combination pattern, or the CSI-RS resource combination pattern number, the definition of the CSI-RS resource combination pattern, and the CSI-RS resource quantity information, where the definition of the combination pattern is used to indicate a mode of a candidate CSI-RS resource combination, the quantity information indicates a quantity of CSI-RS resources included in the candidate CSI-RS resource combination, and the combination pattern number is used to indicate a different definition of a combination pattern.

For example, further, the definition of the combination pattern may be: combining CSI-RS resources, whose numbers are contiguous, of the CSI-RS resources; or combining CSI-RS resources, whose numbers are N apart, of the CSI-RS resources, where N is a positive integer which is greater than or equal to one, and less than a total quantity of CSI-RS resources.

Alternatively, the definition of the combination pattern may further be: combining M CSI-RS resources, whose numbers are contiguous, of the CSI-RS resources, where M is a positive integer which is greater than or equal to one, and less than or equal to a total quantity of CSI-RS resources; or combining M' CSI-RS resources, whose numbers are N apart, of the CSI-RS resources, where N is a positive integer which is greater than or equal to one, and less than the total quantity of CSI-RS resources; and M' is a positive integer which is greater than or equal to one, and less than half of the total quantity of CSI-RS resources.

In addition, the sending unit 41 may be further configured to send information about a numbering manner of the candidate CSI-RS resource combination to a UE before the receiving unit receives the CSI-RS resource combination measured and selected by the UE according to the information of the CSI-RS resource combination, and the measurement result of the joint CSI measurement corresponding to the CSI-RS resource combination, so that after the receiving the CSI-RS resource combination measured and selected by the UE according to the information of the CSI-RS resource combination, and the measurement result of the joint CSI measurement corresponding to the CSI-RS resource combination, the receiving unit 42 is configured to determine, according to the numbering manner, CSI-RS resources in the received CSI-RS resource combination measured and selected by the UE according to the information of the CSI-RS resource combination.

Optionally, the sending unit 41 is further configured to send a UE a number range of a CSI-RS resource applicable to the information of the CSI-RS resource combination before the sending the information of the CSI-RS resource combination to the UE. For example, the sending unit 41 sends aggregation information of CSI-RS resources to the UE, where the aggregation information is used to indicate a measurement source formed by aggregating the CSI-RS resources, and multiple sets of CSI-RS resources included in the measurement source indicate the number range of the CSI-RS resource applicable to the information of the CSI-RS resource combination.

It can be learned from the foregoing description that an apparatus for feeding back a CSI-RS resource combination according to an embodiment of the present invention can effectively reduce the number of bits used when a UE feeds back a CSI measurement result. Specifically, in this embodiment of the present invention, a CSI-RS resource combination mode is predefined, so that a UE only needs to perform a measurement and feedback in a given candidate CSI-RS resource combination, thereby reducing possible CSI-RS resource combination modes, restricting a combination range, greatly reducing the number of joint CSI measurements performed by the UE, and reducing the number of feedback bits.

It can be understood that the apparatus 30 for feeding back a CSI-RS resource combination may be a UE or configured in a UE, and the apparatus 40 for feeding back a CSI-RS resource combination may be a base station or configured in a base station.

Figure 5:
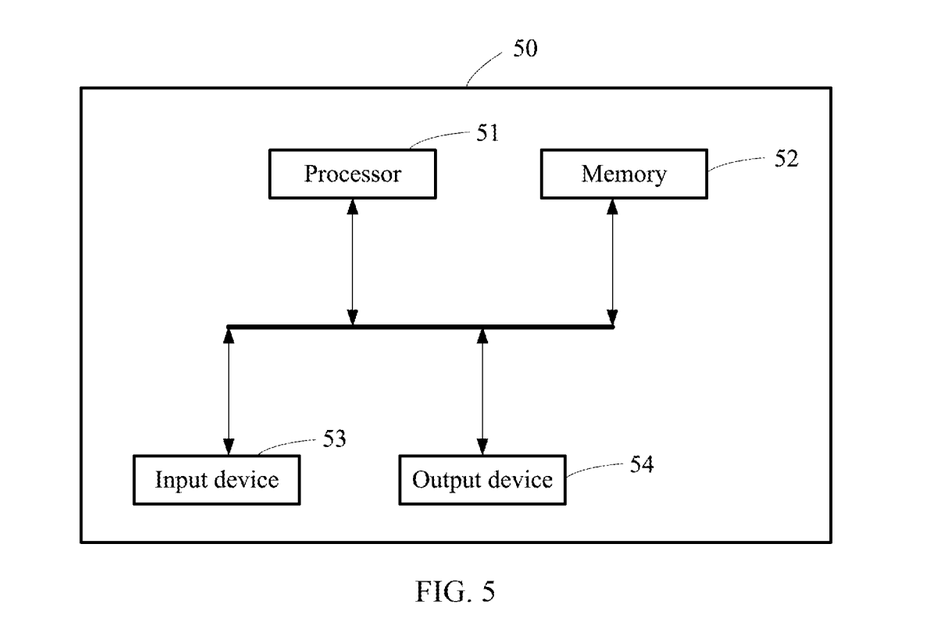
FIG. 5 is a schematic structural diagram of a user equipment according to an embodiment of the present invention.

FIG. 5 is a schematic block diagram of a user equipment 50 according to the present invention. The user equipment 50 includes a processor 51, a memory 52, an input device 53, an output device 54, and the like, which communicate with each other by using a bus. The processor 51 invokes a program stored in the memory 52, and may perform all steps in the foregoing embodiment of a method for feeding back a CSI-RS resource combination.

The processor 51 is configured to execute a program, stored in the memory 52, of an embodiment of the present invention, and implements bidirectional communication with another apparatus by using the bus.

The memory 52 may include a RAM and a ROM, or any fixed storage medium, or a removable storage medium, and is configured to store a program that can execute this embodiment of the present invention or data to be processed in this embodiment of the present invention.

The memory 52 and the processor 51 may be further integrated into a physical module for applying this embodiment of the present invention, and the program that implements this embodiment of the present invention is stored and run on the physical module.

The input device 53 may include any proper apparatus, such as a keyboard and a mouse, and is configured to receive input from a user or input from another device, and send the input to the processor 51.

The output device 54 is configured to output a bit allocation result of an audio signal, and may be a display, a printer, and the like.

Figure 6:
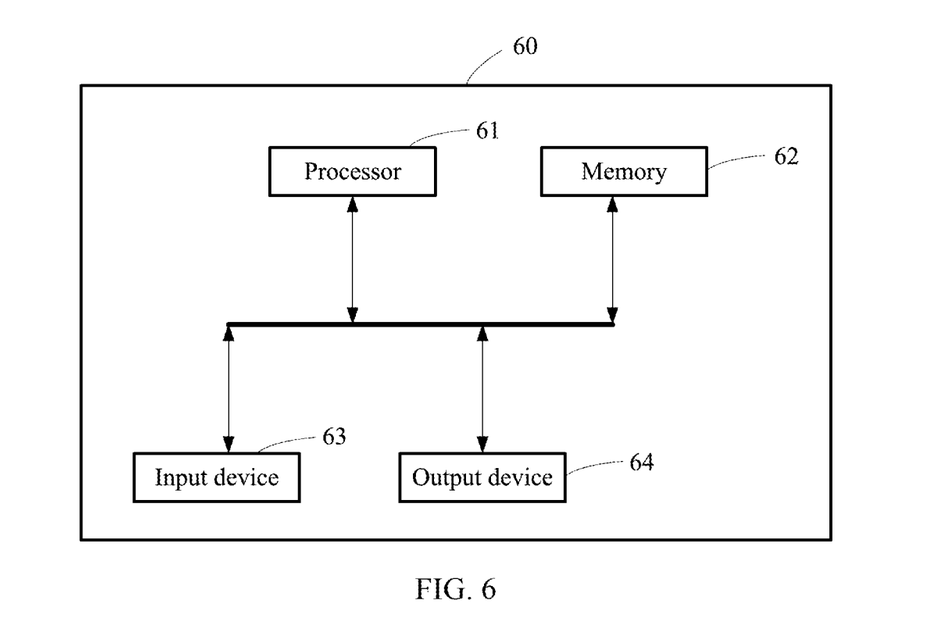
FIG. 6 is a schematic structural diagram of a base station according to an embodiment of the present invention.

FIG. 6 is a schematic block diagram of a base station 60 according to the present invention. The base station 60 includes a processor 61, a memory 62, an input device 63, an output device 64, and the like, which communicate with each other by using a bus. The processor 61 invokes a program stored in the memory 62, and may perform all steps in the foregoing embodiment of a method for feeding back a CSI-RS resource combination.

The processor 61 is configured to execute a program, stored in the memory 62, of an embodiment of the present invention, and implements bidirectional communication with another apparatus by using the bus.

The memory 62 may include a RAM and a ROM, or any fixed storage medium, or a removable storage medium, and is configured to store a program that can execute this embodiment of the present invention or data to be processed in this embodiment of the present invention.

The memory 62 and the processor 61 may be further integrated into a physical module for applying this embodiment of the present invention, and the program that implements this embodiment of the present invention is stored and run on the physical module.

The input device 63 may include any proper apparatus, such as a keyboard and a mouse, and is configured to receive input from a user or input from another device, and send the input to the processor 61.

The output device 64 is configured to output a bit allocation result of an audio signal, and may be a display, a printer, and the like.

It should be understood that, the solution described in each claim of the present invention should be construed as one embodiment, and features in the claims may be combined. For example, different branches of the step subsequent to a determination step in the present invention may be construed as different embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for feeding back a channel state information reference signal (CSI-RS) resource combination, the method comprising:

acquiring information of a CSI-RS resource combination, wherein the information indicates a criterion for determining a subset of CSI-RS resource combinations from a set of CSI-RS resource combinations;

determining, by a user equipment (UE), a candidate CSI-RS resource combination from the set of CSI-RS resource combinations according to the information of the CSI-RS resource combination, wherein the candidate CSI-RS resource combination comprises a plurality of sets of CSI-RS resources combined according to a pattern described by the criterion;

obtaining a combined measurement result from the plurality of sets of CSI-RS resources in the candidate CSI-RS resource combination by performing a CSI measurement according to a set of channel matrices corresponding to the plurality of sets of CSI-RS resources in the candidate CSI-RS resource combination, each channel matrix of the set of channel matrices estimated according to a respective set of CSI-RS resources in the candidate resource combination, wherein the combined measurement result includes measurement data for all sets of CRS-RS resources in the candidate resource combination;

selecting, by the UE, a selected CSI-RS resource combination according to the combined measurement result of the CSI measurement; and transmitting, by the UE, an identifier of the selected CSI-RS resource combination and the combined measurement result of the CSI measurement corresponding to the selected CSI-RS resource combination to a base station, wherein the identifier has a number of bits that is limited to a number of bits needed to identify the selected CSI-RS resource combination in the set of CSI-RS resource combinations.

2. The method according to claim 1, wherein acquiring information of the CSI-RS resource combination comprises:

acquiring a definition of a combination pattern that includes the pattern described by the criterion, wherein the definition of the combination pattern indicates a mode of a candidate CSI-RS resource combination; and wherein determining the candidate CSI-RS resource combination comprises:

determining the candidate CSI-RS resource combination according to the definition of the combination pattern.

3. The method according to claim 2, wherein acquiring information of the CSI-RS resource combination further comprises:

acquiring quantity information, wherein the quantity information indicates a quantity of sets of CSI-RS resources comprised in the candidate CSI-RS resource combination; and wherein determining the candidate CSI-RS resource combination according to the information of the CSI-RS resource combination comprises:

determining the candidate CSI-RS resource combination according to the definition of the combination pattern and the quantity information.

4. The method according to claim 2, wherein the definition of the combination pattern comprises:

combining M sets of CSI-RS resources, whose numbers are contiguous, wherein M is a positive integer which is greater than or equal to one, and less than or equal to a total quantity of sets of CSI-RS resources; or combining M' sets of CSI-RS resources, whose numbers are N apart, wherein N is a positive integer which is greater than or equal to one, and less than the total quantity of sets of CSI-RS resources; and M' is a positive integer which is greater than or equal to one, and less than half of the total quantity of sets of CSI-RS resources.

5. The method according to claim 1, wherein before transmitting the selected CSI-RS resource combination and the combined measurement result of the CSI measurement, the method further comprises:

acquiring information about a numbering manner of the candidate CSI-RS resource combination associated with the pattern described by the criterion; and wherein transmitting the selected CSI-RS resource combination and the combined measurement result of the CSI measurement comprises:

numbering the selected CSI-RS resource combination according to the numbering manner; and transmitting the number and CSI corresponding to the number to the base station.

6. The method according to claim 1, wherein before acquiring information of the CSI-RS resource combination, the method further comprises:

acquiring a number range of a CSI-RS resource applicable to the information of the CSI-RS resource combination.

7. The method according to claim 6, wherein acquiring the number range of a CSI-RS resource applicable to the information of the CSI-RS resource combination comprises:

acquiring aggregation information of CSI-RS resources, wherein the aggregation information is used to indicate a measurement source formed by aggregating the CSI-RS resources, and multiple sets of CSI-RS resources comprised in the measurement source indicate the number range of the CSI-RS resource applicable to the information of the CSI-RS resource combination.

8. A method for feeding back a channel state information reference signal (CSI-RS) resource combination, the method comprising:

transmitting, by a base station, information of a CSI-RS resource combination to a user equipment (UE), wherein the information indicates a criterion for determining a subset of CSI-RS resource combinations from a set of CSI-RS resource combinations, the subset of CSI-RS resource combinations corresponding to a pattern described by the criterion; and receiving, by the base station, an identifier of a selected CSI-RS resource combination selected by the UE according to the information of the CSI-RS resource combination, and a combined measurement result of a CSI measurement corresponding to the selected CSI-RS resource combination, the CSI measurement performed according to a set of channel matrices corresponding to a plurality of sets of CSI-RS resources in the selected CSI-RS resource combination, each channel matrix of the set of channel matrices estimated according to a respective set of CSI-RS resources in the selected CSI-RS resource combination, wherein the combined measurement result includes measurement data for all sets of CRS-RS resources in the selected CSI-RS resource combination, and wherein the identifier has a number of bits that is limited to a number of bits needed to identify the selected CSI-RS resource combination in the set of CSI-RS resource combinations.

9. The method according to claim 8, wherein the information of the CSI-RS resource combination comprises CSI-RS resource quantity information, or a definition of a CSI-RS resource combination pattern and the CSI-RS resource quantity information, or a CSI-RS resource combination pattern number, or the CSI-RS resource combination pattern number and the definition of the CSI-RS resource combination pattern, or the CSI-RS resource combination pattern number and the CSI-RS resource quantity information, or the CSI-RS resource combination pattern number, the definition of the CSI-RS resource combination pattern, and the CSI-RS resource quantity information, wherein the definition of the CSI-RS resource combination pattern is used to indicate a mode of a candidate CSI-RS resource combination, the CSI-RS resource quantity information indicates a quantity of CSI-RS resources comprised in the candidate CSI-RS resource combination, and the CSI-RS resource combination pattern number is used to indicate a different definition of a CSI-RS resource combination pattern.

10. The method according to claim 8, wherein before receiving the selected CSI-RS resource combination and the combined measurement result of the CSI measurement, the method further comprises:
sending information about a numbering manner of a candidate CSI-RS resource combination associated with the pattern described by the criterion to a UE; and
wherein after receiving the selected CSI-RS resource combination and the combined measurement result of a CSI measurement, the method further comprises:
determining, according to the numbering manner, CSI-RS resources in the selected CSI-RS resource combination selected by the UE according to the information of the CSI-RS resource combination.

11. The method according to claim 8, wherein before transmitting information of the CSI-RS resource combination to the UE, the method further comprises:
sending, to the UE, a number range of a CSI-RS resource applicable to the information of the CSI-RS resource combination.

12. The method according to claim 11, wherein sending the number range of the CSI-RS resource specifically comprises:
sending aggregation information of CSI-RS resources to the UE, wherein the aggregation information is used to indicate a measurement source formed by aggregating the CSI-RS resources, and multiple sets of CSI-RS resources comprised in the measurement source indicate the number range of the CSI-RS resource applicable to the information of the CSI-RS resource combination.

13. An apparatus for feeding back a channel state information reference signal (CSI-RS) resource combination, comprising:
a memory storing instructions; and
a processor configured to execute the instructions stored in the memory, the processor executing the instructions for:
acquiring information of a CSI-RS resource combination, wherein the information indicates a criterion for determining a subset of CSI-RS resource combinations from a set of CSI-RS resource combinations;
determining a candidate CSI-RS resource combination from the set of CSI-RS resource combinations according to the information of the CSI-RS resource combination, wherein the candidate CSI-RS resource combination comprises a plurality of sets of CSI-RS resources combined according to a pattern described by the criterion;
obtaining a combined measurement result from the plurality of sets of CSI-RS resources in the candidate CSI-RS resource combination by Performing a CSI measurement according to a set of channel matrices corresponding to the plurality of sets of CSI-RS resources in the candidate CSI-RS resource combination, each channel matrix of the set of channel matrices estimated according to a respective set of CSI-RS resources in the candidate resource combination, wherein the combined measurement result includes measurement data for all sets of CRS-RS resources in the candidate resource combination;
selecting a selected CSI-RS resource combination according to the combined measurement result of the CSI measurement; and
transmitting the selected CSI-RS resource combination and the combined measurement result of the CSI measurement corresponding to the selected CSI-RS resource combination to a base station.

14. The apparatus according to claim 13, wherein acquiring information comprises acquiring a definition of a combination pattern, wherein the definition of the combination pattern is used to indicate a mode of a candidate CSI-RS resource combination; and
wherein determining a candidate CSI-RS resource combination comprises determining the candidate CSI-RS resource combination according to the definition of the combination pattern.

15. The apparatus according to claim 14, wherein acquiring information comprises further comprises acquiring quantity information, wherein the quantity information indicates a quantity of CSI-RS resources comprised in the candidate CSI-RS resource combination,
wherein determining the candidate CSI-RS resource combination comprises determining the candidate CSI-RS resource combination according to the definition of the combination pattern and the quantity information.

16. The apparatus according to claim 14, wherein acquiring information comprises further comprises:
acquire a combination pattern number, wherein the combination pattern number is used to indicate a different definition of a combination pattern,
wherein determining the candidate CSI-RS resource combination comprises:
determining the candidate CSI-RS resource combination according to the combination pattern number and the definition of the combination pattern corresponding to the combination pattern number, or
determining the candidate CSI-RS resource combination according to the combination pattern number, the definition of the combination pattern corresponding to the combination pattern number, and quantity information,
wherein the combined combination pattern number has a number of bits that is limited to a number of bits needed to identify the selected CSI-RS resource combination in the set of CSI-RS resource combinations.

17. The apparatus according to claim 13, wherein acquiring information comprises further comprises:

acquiring information about a numbering manner of the candidate CSI-RS resource combination associated with the pattern described by the criterion before the selected CSI-RS resource combination and the combined measurement result of the CSI measurement corresponding to the selected CSI-RS resource combination are transmitted to the base station, wherein transmitting the selected CSI-RS resource combination comprises:

numbering the selected CSI-RS resource combination according to the numbering manner; and transmitting the number and CSI corresponding to the number to the base station.

18. The apparatus according to claim 13, wherein acquiring information comprises further comprises:

acquiring a number range of a CSI-RS resource applicable to the information of the CSI-RS resource combination before the acquiring the information of the CSI-RS resource combination.

19. The apparatus according to claim 18, wherein acquiring information comprises further comprises:

acquiring aggregation information of CSI-RS resources, wherein the aggregation information is used to indicate a measurement source formed by aggregating the CSI-RS resources, and multiple sets of CSI-RS resources comprised in the measurement source indicate the number range of the CSI-RS resource applicable to the information of the CSI-RS resource combination.

20. An apparatus for feeding back a CSI-RS resource combination, comprising:

a memory storing instructions; and a processor configured to execute the instructions stored in the memory, the processor executing the instructions for:

transmitting information of a CSI-RS resource combination to a user equipment (UE), wherein the information indicates a criterion for determining a subset of CSI-RS resource combinations from a set of CSI-RS resource combinations, the subset of CSI-RS resource combinations corresponding to a pattern described by the criterion; and receiving an identifier of a selected CSI-RS resource combination selected by the UE according to the information of the CSI-RS resource combination, and a combined measurement result of a CSI measurement corresponding to the selected CSI-RS resource combination, the CSI measurement performed according to a set of channel matrices corresponding to a plurality of sets of CSI-RS resources in the selected CSI-RS resource combination, each channel matrix of the set of channel matrices estimated according to a respective set of CSI-RS resources in the selected CSI-RS resource combination, wherein the combined measurement result includes measurement data for all sets of CRS-RS resources in the selected CSI-RS resource combination, wherein the identifier has a number of bits that is limited to a number of bits needed to identify the selected CSI-RS resource combination in the set of CSI-RS resource combinations.

21. The apparatus according to claim 20, wherein the information of the CSI-RS resource combination comprises CSI-RS resource quantity information, or a definition of a CSI-RS resource combination pattern and the CSI-RS resource quantity information, or a CSI-RS resource combination pattern number, or the CSI-RS resource combination pattern number and the definition of the CSI-RS resource combination pattern, or the CSI-RS resource combination pattern number and the CSI-RS resource quantity information, or the CSI-RS resource combination pattern number, the definition of the CSI-RS resource combination pattern, and the CSI-RS resource quantity information, wherein the definition of the CSI-RS resource combination pattern is used to indicate a mode of a candidate CSI-RS resource combination, the CSI-RS resource quantity information indicates a quantity of CSI-RS resources comprised in the candidate CSI-RS resource combination, and the CSI-RS resource combination pattern number is used to indicate a different definition of a CSI-RS resource combination pattern.

22. The apparatus according to claim 20, wherein transmitting information of the CSI-RS resource combination comprises:

sending information about a numbering manner of a candidate CSI-RS resource combination associated with the pattern described by the criterion to a UE before receiving the selected CSI-RS resource combination selected by the UE according to the information of the CSI-RS resource combination, and the combined measurement result of the CSI measurement corresponding to the CSI-RS resource combination, wherein receiving the selected CSI-RS resource combination comprises:

after receiving the selected CSI-RS resource combination and the combined measurement result of the CSI measurement, determining, according to the numbering manner, CSI-RS resources in the selected CSI-RS resource combination selected by the UE according to the information of the CSI-RS resource combination.

23. The apparatus according to claim 20, wherein transmitting information of the CSI-RS resource combination comprises:

sending, to a UE, a number range of a CSI-RS resource applicable to the information of the CSI-RS resource combination before the transmitting the information of the CSI-RS resource combination to the UE.

24. The apparatus according to claim 23, wherein transmitting information of the CSI-RS resource combination comprises:

sending aggregation information of CSI-RS resources to the UE, wherein the aggregation information is used to indicate a measurement source formed by aggregating the CSI-RS resources, and multiple sets of CSI-RS resources comprised in the measurement source indicate the number range of the CSI-RS resource applicable to the information of the CSI-RS resource combination.

* * * * *